United States Patent [19]

Hadhanyi

[11] 3,911,115
[45] Oct. 7, 1975

[54] CYCLOHEPTAAMYLOSE-SILVER ALKANOL AMMINE COMPLEX COMPOUND

[75] Inventor: Andreas Hadhanyi, Eschweiler-Bergrath, Germany

[73] Assignee: H. Trommsdorff, Aachen, Germany

[22] Filed: Nov. 29, 1973

[21] Appl. No.: 420,245

[30] Foreign Application Priority Data
Dec. 11, 1972 Germany............................ 2260536

[52] U.S. Cl............................ 424/180; 260/209 R
[51] Int. Cl........................ C07g 3/00; C07c 47/18
[58] Field of Search.................. 260/209 R; 424/180

[56] References Cited
UNITED STATES PATENTS
2,923,704  2/1960  Berger et al. .................... 260/209 R
3,122,534  2/1964  Muetgeert et al............... 260/209 R OTHER PUBLICATIONS
Boessler et al., "Chem. Abst.," Vol. 73, 1970, p. 77512h.

Primary Examiner—Johnnie R. Brown
Attorney, Agent, or Firm—Burgess, Dinklage & Sprung

[57] ABSTRACT

A molecular inclusion compound comprising a silver alkanol ammine complex and cycloheptaamylose having about 1 to 3 gram atoms of silver per 10 moles of cycloheptaamylose of the formula

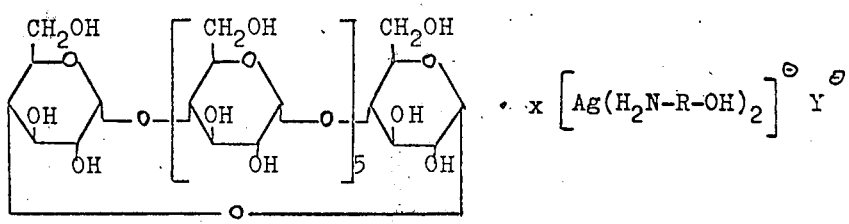

wherein $x$ is about 0.10 to 0.30, R is an alkylene radical of 2 to about 5 carbon atoms, and Y is the anion of a soluble silver salt, is prepared by dissolving cycloheptaamylose in an alkanolamine, dissolving a silver salt in the solution thereby to form a molecular inclusion compound comprising the silver alkanol ammine complex and the cycloheptaamylose and recovering the molecular inclusion compound in solid form from the solution.

8 Claims, No Drawings

CYCLOHEPTAAMYLOSE-SILVER ALKANOL AMMINE COMPLEX COMPOUND

The invention relates to molecular inclusion compounds of a silver alkanol ammine complex and cycloheptaamylose and a method for their preparation.

These and other objects and advantages are realized in accordance with the present invention pursuant to which there are provided novel molecular inclusion compounds of cycloheptaamylose and a silver alkanol ammine complex of the formula

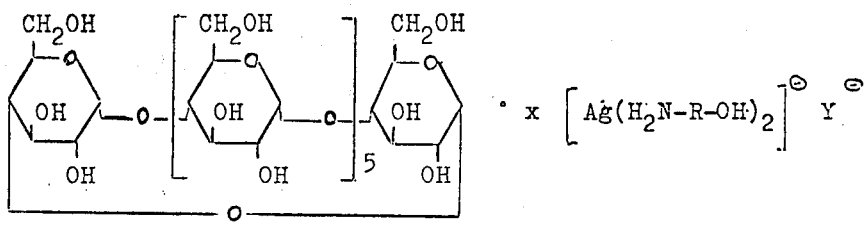

wherein $x$ is about 0.10 to 0.30, R is an alkylene radical of 2 to about 5 carbon atoms and Y is the anion of a soluble silver salt.

In accordance with the invention the novel cycloheptaamylose inclusion compounds are prepared by dissolving cycloheptaamylose in an alkanolamine of the formula $H_2N-R-OH$, dissolving a silver salt AgY in the solution, R and Y having the same meanings assigned to them previously, and allowing the resulting molecular inclusion compound comprising the silver alkanol ammine complex and the cycloheptaamylose to crystallize out.

Cycloheptaamylose, also called β-dextrin, is a cyclic dextrin comprising seven glucose units. Along with the α-dextrin having six glucose units and the γ-dextrin having eight glucose units, it belongs to the class of cyclic dextrins which are also called Schardinger dextrins and which can form molecular inclusion compounds by inclusion of foreign molecules in the cyclic interstices (Freudenberg, K. and Cramer, F., Chem. Ber. 83 296 (1950). Only such foreign molecules having an adequate space arrangement can be enclosed in the interstices.

It is known that under certain conditions metallic silver and a number of water-soluble silver salts are effective germicides. For example, it has been proposed to sterilize potable water with a small amount of colloidal silver. To a limited extent, concentrated aqueous silver nitrate solutions can be used if steps are taken to avoid their coming into contact with the human skin since they result in discoloration.

Colloidal silver is also utilized as the active ingredient in germicidal medicaments for the nasal area and, likewise, for wound disinfection and in the treatment of burns of all degrees of seriousness. The corrosive sticks of silver nitrates so used are generally known under the name "Hollenstein".

The use of water-soluble silver salts remained limited until now because when using concentrated solutions of the salts, the skin became so irritated that these solutions had to be considered as corrosive agents.

C. Moyer and W. Monafo (Ann. N.Y. Acad. Sci., 150, 937 (1968) reported good results in the treatment of burns with a 0.5% silver nitrate solution. Nowadays, this therapy is wide-spread nearly all over the world even though several disadvantages are associated with its use. Thus, the burns must be in permanent contact with the silver nitrate solution, which, however, is very bothersome (Wighers, J. Hawaii Med. J., 4,298 (1968). The patients feel constantly irritated owing to the wet bandage which must be applied on the skin. In addition, the silver nitrate solution leads to a strong pollution of all objects with which it comes into contact. Metallic objects may even be damaged. Argyria may occur as a result of prolonged silver treatment. This is an accumulation of silver sulfide in the connective tissue which results in an irreversible dark discoloration of the tissue. Furthermore, the treatment with silver nitrate may lead, for example, to hyponatraemia and to hypochloroaemia as well as to a methaemoglobinaemia.

It is accordingly an object of the present invention to provide silver suited for the above treatments but in a form which does not lead to the enumerated disadvantages.

As alkanol amines, monoalkanolamines such as monoethanolamine, β-amino-n-propanol, β-hydroxyisopropylamine, monobutanol amine and monopentanol amine are preferably used. Silver salts which are soluble in alkanolamines, such as silver chloride, silver acetate, silver oxalate and silver tartrate are used as silver salts. Silver nitrate is the preferred silver salt.

In carrying out the process of the invention, the cycloheptaamylose is dissolved in the amine, advantageously by shaking and heating, because dissolving at room temperature takes a relatively long time. It is expedient to conduct the reaction with an excess of amine relative to silver salt.

However, it is also possible to reverse the reaction's sequence by first preparing the silver ammine complex by dissolving the silver salt in the monoalkanolamine and subsequently reacting with the cycloheptaamylose.

The reaction product precipitates in crystalline form from the reaction mixture, preferably by cooling. Moreover, it can be precipitated from the reaction mixture by adding suitable precipitants such as ethanol. The precipitate is subsequently washed until the spent wash liquid no longer contains any silver and amine. For example, cold acetone is suitable as wash liquid.

In the inclusion compound obtained according to the invention the silver salt is adequately protected against oxidation and decomposition. The aqueous solutions prepared therefrom are stable over a long period of time even if they are exposed to light. Objects and tissues which come into contact with the solution are not discolored. The new inclusion compounds are very compatible, and practically non-toxic; they are remarkable by virtue of their highly germicidal action. They are particularly suitable for the treatment of burns and infected wounds as well as for the local treatment of mycosis. They are externally utilized for the skin and intravaginal treatment. Preferred forms of use are aqueous solutions; however, they may be used for example in the form of soaps, ointments, powders, sprays, impregnated tampons, dressing materials, suppositories and tinctures. They are prepared by conventional methods which are familiar to the skilled artisan. The dosage of the new substances depends on the nature of the infection to be treated. Ointments, solutions and sprays are preferably employed with an active ingredient concentration of about 0.01 – 5.0% by weight although concentrations of 5% or even higher may also be employed.

The invention will be further described in the following illustrative examples.

EXAMPLE 1

51 g of β-cycloheptaamylose are dissolved in 100 ml of monoethanolamine by heating to 80°C. After cooling to 35°C, 10 g of silver nitrate are added thereto. The mixture is agitated until a clear solution is obtained. The solution is combined incrementally with ethanol heated to 35°C, is filtered immediately thereafter, and the filtrate is cooled. After it has solidified to a crystal sludge excess liquid is removed by suction filtration and the residue is washed with cold acetone until no silver or ethanolamine can be detected in the washing liquid. After drying the residue, 43.2 g of a light gray crystalline powder are obtained, melting with decomposition at 290° – 300°C $[\alpha]20/D = +160°C$ (water).

EXAMPLE 2

Example 1 is repeated except that the reaction is conducted at room temperature with 3 g of silver nitrate dissolved in 100 ml of water. The precipitation of the reaction product is carried out by cooling to low temperature without the addition of ethanol. 41.0 grams of a white powder are obtained.

EXAMPLE 3

The procedure of Example 1 is repeated except that silver acetate is used as the silver salt. No ethanol is utilized and the silver acetate is dissolved in 100 ml of water, and cycloheptaamylose and monoethanolamine are added to form the reaction mixture. The silver ethanol ammine-cycloheptaamylose inclusion compound is obtained as a white powder.

EXAMPLE 4

Example 3 is repeated except that silver tartrate is used as the silver salt. The silver diethanol ammine tartrate-cycloheptaamylose inclusion compound is obtained in the form of a fine crystalline powder.

EXAMPLE 5

50 g of cycloheptaamylose are dissolved in 100 ml of monobutanolamine at room temperature. The solution is placed in an ice bath and 10 g of silver nitrate are added thereto incrementally with continuous stirring. The reaction is exothermic so, if stirring is interrupted, the temperature may increase up to 80° – 90°C and the formation of the complex will be only incompletely achieved. Accordingly by stirring, cooling and controlling the rate of addition of the silver nitrate the temperature is kept at about 4°–6°C. 100 ml of n-propanol are added in about 75 ml increments to the clear viscous solution while further stirring. Upon each addition of n-propanol, a milky turbidity is formed by colloidal precipitation of the molecular inclusion compound; however it is redissolved due to the stirring. As soon as the total amount of n-propanol has been added, the mixture is removed from the ice bath and is allowed to stand for about 12 hours at a temperature of about 4°C. A gel-like mobile crystalline material is formed which separates at room temperature from the excess mother liquor, which liquor is removed by simple paper filtration and discarded. The precipitate which remains on the filter is rewashed with very cold de-ionized water and then with acetone. Drying is effected at room temperature. There is obtained a white crystalline powder, mp. 261° – 270°C with decomposition to a black material.

EXAMPLE 6

50 g of cycloheptaamylose are dissolved in a prepared mixture of 80 ml of monoethanolamine and 20 ml of β-amino-n-propanol with heating to 60° – 80°C. The solution is placed in an ice bath (about 4°C water temperature) and 10 g of silver nitrate are added incrementally with continuous stirring until the silver nitrate has been dissolved. The solution is removed from the ice bath and combined with 300 ml of 96% ethanol. A white precipitate is immediately formed which is separated from the alcohol and mother liquor by paper filtration. It is washed with acetone and dried at room temperature in a dark room. A white crystalline powder is obtained $[\alpha] 20/D + 152°C$ water.

EXAMPLE 7

10 g of silver nitrate are dissolved in 100 ml of monoethanolamine on an ice bath while constantly stirring. Thereafter, 5 g of β-cyclodextrin are added to the resulting solution of silver ammine complex and the mixture is stirred until it is completely dissolved, at which time about 62% of the silver ammine is enclosed in the cyclodextrin, the percentage being determined by titration of monoethanolamine with lactic acid up to pH 7, the amount of lactic acid consumed being used as an index. A viscous liquid having a pH of 12.5 $[\alpha] 20/D = 92.5$ is obtained. Furthermore, measurement in a spectrophotometer at 302 nm with water as standard gives E 1%/1cm : 0.504 (molecular inclusion compound in solution). The excess monoethanolamine can be neutralized by lactic acid

EXAMPLE 8

8.4 g of silver chloride are dissolved in 100 ml of monoethanolamine on an ice bath with continuous stirring. After the formation of the silver ammine complex compound, the reaction product is satruated with 50 g of β-cyclodextrin at room temperature while continuously stirring. Thereafter, 100 ml of 96% ethanol are added incrementally while stirring and the clear solution is allowed to stand at 4°C for 24 hours. A crystal sludge is obtained which is separated from the mother liquor by paper filtration. It is subsequently washed with acetone and dried at room temperature. 1 to 3 gram atoms of silver per 10 moles of cycloheptaamylose were obtained in several runs thus conducted.

EXAMPLE 9

The inclusion compound (I) obtained according to Example 7 as well as silver sulfadiazine (II) were studied in respect of their germicidal effects. 0.5% aqueous solutions of Compounds I and II respectively were further diluted until they showed no inhibiting effect towards specific bacteriological cultures. The degree of dilution of the 0.5% solutions at which the growth of the tested microorganisms reoccurs is specified in the following Table:

|  | I | II |
|---|---|---|
| Staph.aureus heam. SG 511 | 1:160 | 1:80 |
| E. coli | 1:160 | 1:40 |
| Pseudomonas aeruginosa | 1:160 | 1:40 |
| Candida albicans | 1:320 | 1:40 |

Thus, the novel compound is effective at one-half to one-eighth the concentration of the silver sulfadizine.

It will be appreciated that the instant specification and examples are set forth by way of illustration and not limitation, and that various modifications and changes may be made without departing from the spirit and scope of the present invention.

What is claimed is:

1. A molecular inclusion compound comprising a silver alkanol ammine complex and cycloheptaamylose having about 1 to 3 gram atoms of silver per 10 moles of cycloheptaamylose, the alkanol having about 2 to 5 carbon atoms.

2. A molecular inclusion compound according to claim 1 of the formula

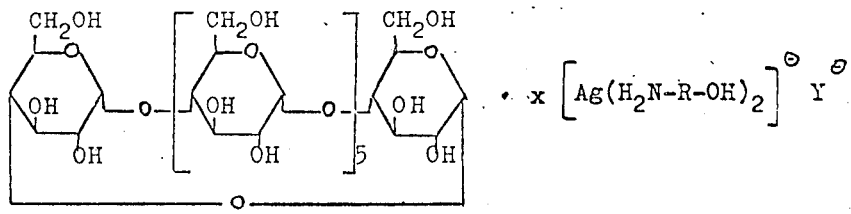

wherein $x$ is about 0.10 to 0.30, R is an alkylene radical of 2 to about 5 carbon atoms, and Y is a chloride, acetate, oxalate, tartrate or nitrate anion.

3. A molecular inclusion compound according to claim 2, wherein R is —$C_2H_4$— and Y is the nitrate anion.

4. A method for the preparation of a molecular inclusion compound according to claim 1, comprising dissolving cycloheptaamylose in an alkanolamine, dissolving a silver salt selected from the group consisting of the chloride, acetate, oxalate, tartrate and nitrate in the solution thereby to form a molecular inclusion compound comprising the silver alkanol ammine complex and the cycloheptaamylose, and separating the molecular inclusion compound in solid form from the solution.

5. The method according to claim 4, wherein the molecular inclusion compound is recovered from its solution by standing in the cold.

6. The method according to claim 4, wherein the molecular inclusion compound is recovered from its solution by addition of alcohol.

7. The method according to claim 4, wherein said alkanolamine has 2 to about 5 carbon atoms, and said silver salt is at least one member selected from the group consisting of silver chloride, acetate, oxalate, tartrate and nitrate.

8. A pharmaceutical composition comprising a germicidally effective amount of a molecular inclusion compound according to claim 1 together with a pharmacologically acceptable carrier.

* * * * *